United States Patent [19]

Chan et al.

[11] Patent Number: 5,127,606
[45] Date of Patent: Jul. 7, 1992

[54] AIRCRAFT ENGINE MOUNT ADAPTER AND METHOD

[75] Inventors: Chi F. Chan, Mesa; John E. Hill, Phoenix, both of Ariz.

[73] Assignee: Allied-Signal Inc., Morris Township, Morris County, N.J.

[21] Appl. No.: 614,884

[22] Filed: Nov. 16, 1990

[51] Int. Cl.⁵ .................................. B64D 27/00
[52] U.S. Cl. ............................ 244/54; 60/39.31; 248/554
[58] Field of Search ............ 244/54, 55; 248/554, 248/555, 556, 557; 60/39.31

[56] References Cited

U.S. PATENT DOCUMENTS

| | | | |
|---|---|---|---|
| 2,722,801 | 11/1955 | Lombard | 248/554 |
| 2,833,493 | 5/1958 | Pfarr et al. | 244/54 |
| 3,042,349 | 7/1962 | Pirtle et al. | 248/554 |
| 3,063,661 | 11/1962 | Smith | 244/54 |
| 3,217,490 | 11/1965 | Chilvers | 60/39.31 |
| 3,222,017 | 12/1965 | Bobo | 248/557 |
| 3,397,855 | 8/1968 | Newland | 248/554 |
| 3,445,079 | 5/1969 | Burns | 244/54 |
| 3,848,832 | 11/1974 | Stanley et al. | 244/54 |
| 3,979,087 | 9/1976 | Boris et al. | 244/54 |
| 4,044,973 | 8/1977 | Moorehead | 244/54 |
| 4,150,802 | 4/1979 | Evelyn et al. | 244/54 |
| 4,266,741 | 5/1981 | Murphy | 244/54 |
| 4,326,682 | 4/1982 | Nightingale | 244/54 |
| 4,555,078 | 11/1985 | Grognard | 244/54 |
| 4,854,525 | 8/1989 | Chee | 248/554 |

Primary Examiner—Joseph F. Peters, Jr.
Assistant Examiner—Anne E. Bidwell
Attorney, Agent, or Firm—Jerry J. Holden; James W. McFarland; Robert A. Walsh

[57] ABSTRACT

An aircraft engine mount adapter and method is provided that permits the coupling of an aircraft engine to an aircraft when the pickup points on the engine are incompatible with the location of the mounting pins on the aircraft. The adapter consists of an arcuate shaped member having sufficient lateral curvature so as to be selectively positionable along the length and about the circumference of the engine's casing. Means for locking onto the mounting pins are disposed along the outer surface of the member. The member has a plurality of flanges which are bolted to flanges extending outwards from the engine's casing.

5 Claims, 2 Drawing Sheets

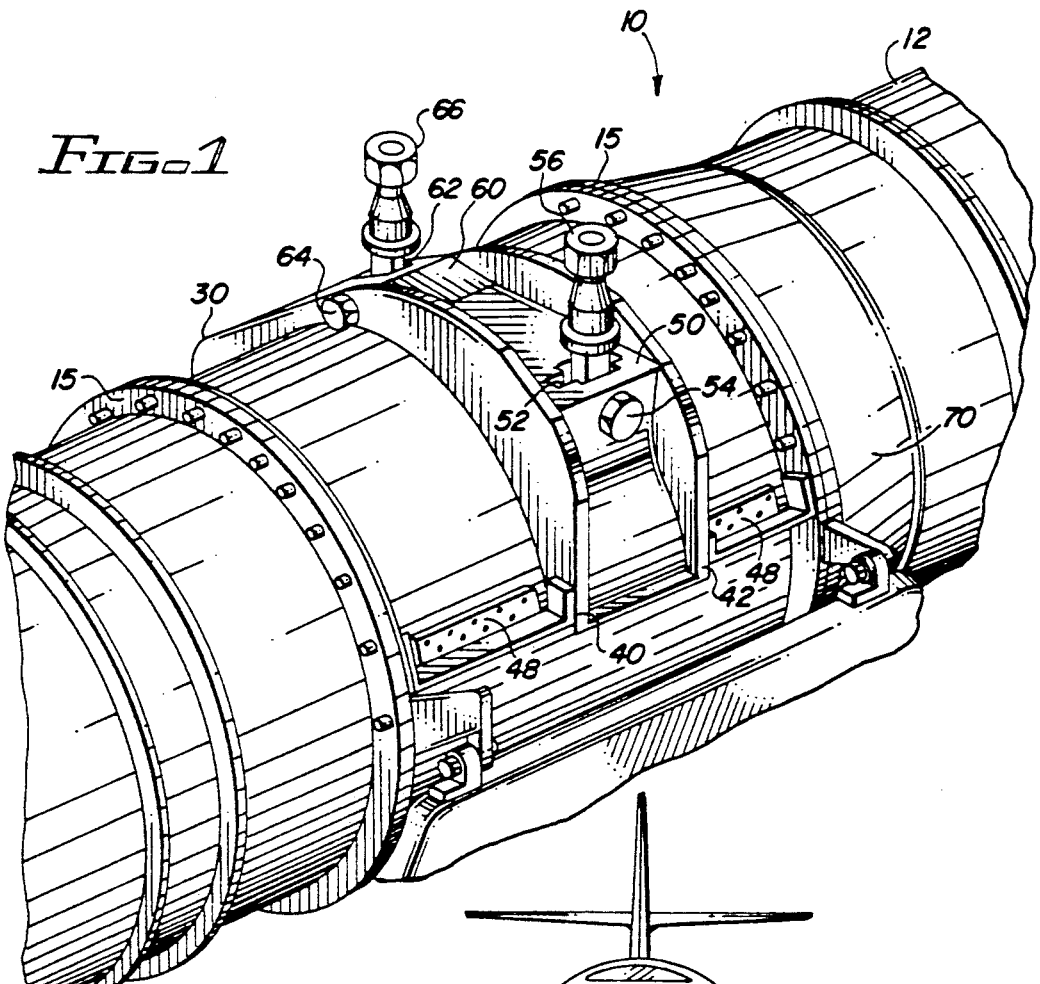
FIG-1
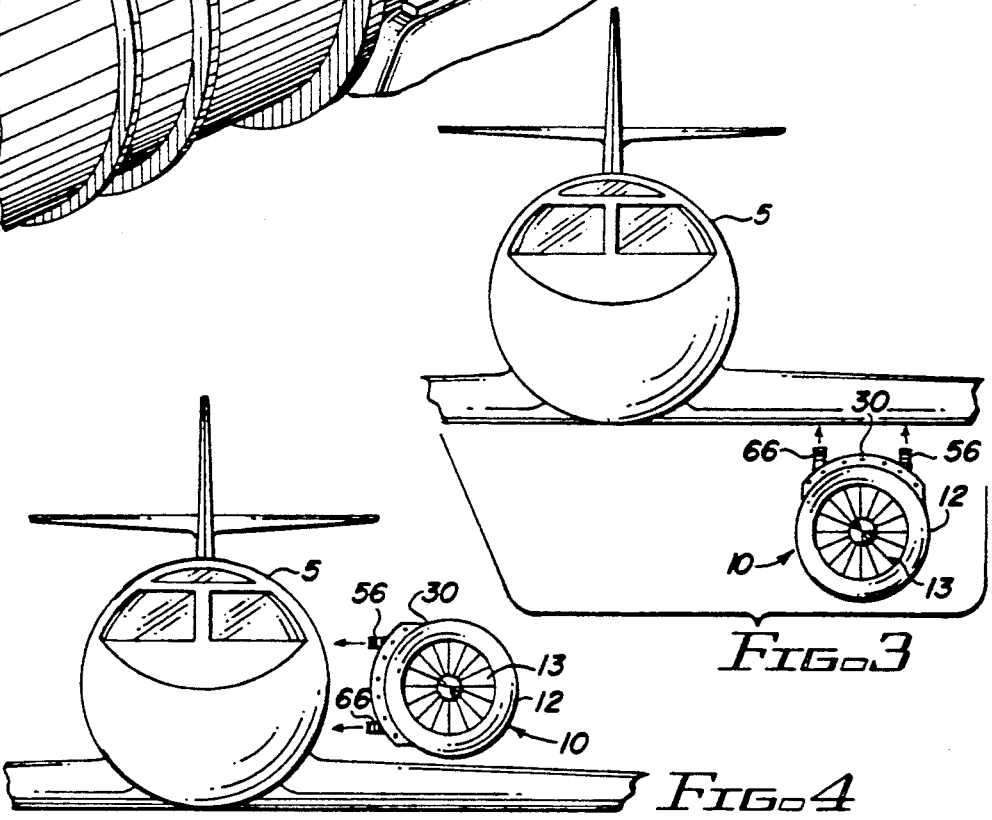
FIG-3
FIG-4

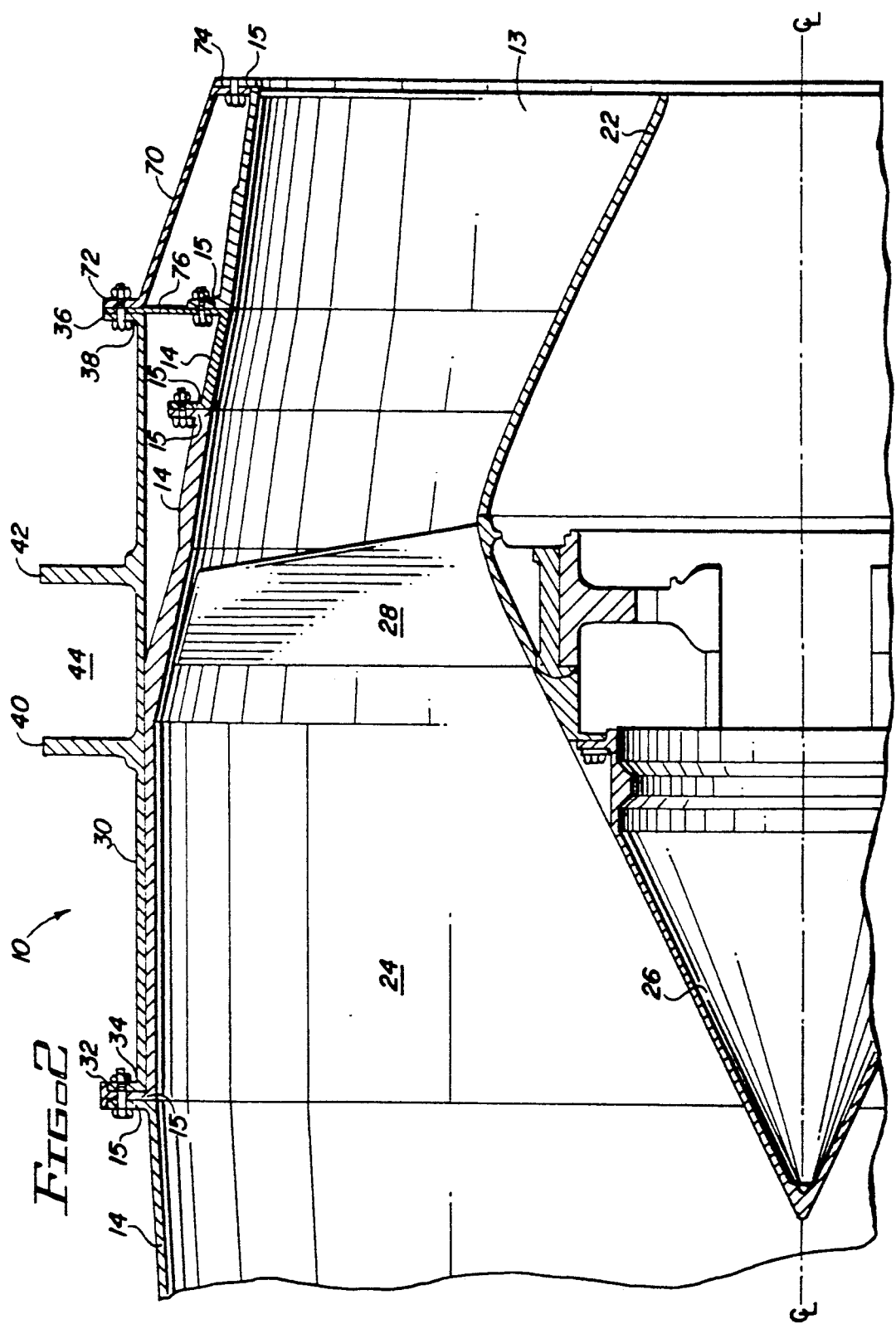

AIRCRAFT ENGINE MOUNT ADAPTER AND METHOD

TECHNICAL FIELD

The present invention generally relates to an apparatus and method for mounting an aircraft engine to the airframe of an aircraft and in particular, to an engine mount adapter that can be attached at any location along the length and about the circumference of the engine casing so that the pickup points of the engine become compatible with the pickup points o the airframe.

BACKGROUND OF THE INVENTION

Generally, both a forward and a rear mount are used to couple an aircraft engine to an aircraft. Both these mounts can have stabilizing pins and/or thrust pins. Stabilizing pins maintain the position of the engine against the force of gravity and thrust pins maintain a fixed relationship between the engine and the airframe when the engine is operating and providing a thrusting force to propel the aircraft forward. Each of these pins is detachably coupled to both the airframe and the aircraft engine casing at fixed locations along the airframe and casing called pickup points. For example, in a wing installation, the aircraft pickup points are usually located along the underside of the wing and the engine pickup points are located along the top of the engine casing. Alternatively, for left side fuselage installation, the aircraft pickup points are located on the left side of the airframe and the engine pickup points are located along the right side of the engine casing. At each of these pickup points, on both the aircraft and engine, there is sufficient structural strength to support both the stabilizing and thrust loads. Consequently, the locations of these pickup points are usually selected during the preliminary design phases of the aircraft and engine to assure that the pickup points on the aircraft are compatible with the pickup points on the engine casing. Once the locations of the pickup points are selected it is very difficult to relocate these points without redesigning either the engine casing or the airframe.

During the life of an aircraft, the engines may become obsolete due to advances in technology, or they may become under powered due to increases in payload requirements. One solution to this problem is to replace the old engines with new engines that are more reliable and efficient. Unfortunately, many of the new engines do not have pickup points that are compatible with the pickup points on the airframe.

Accordingly, a need exists for an engine mount adapter that can be attached at any location along the length and about the circumference of the engine casing so that the engine can be coupled to the airframe even though their respective pickup points are incompatible.

SUMMARY OF THE INVENTION

An object of the present invention is to provide an apparatus and method for mounting to the casing of an aircraft engine to an aircraft airframe when the pickup points on the engine are incompatible with the pickup points on the airframe.

The present invention achieves the above-stated objective by providing a arcuate shaped member having sufficient lateral curvature so as to be positionable at any location along the length and about the circumference of the engine casing and having means for detachably coupling to the stabilizing and thrust pins of the aircraft.

These and other objects, features and advantages of the present invention are specifically set forth in or will become apparent from the following detailed description of the preferred embodiment of the invention when read in conjunction with the accompanying drawings.

BRIEF DESCRIPTION OF THE DRAWINGS

FIG. 1 is a perspective view of an engine mount adapter mounted on an aircraft engine.

FIG. 2 is a partial cross-sectional view of the circuit engine of FIG. 1.

FIG. 3 shows the adapter and engine of FIG. 1 being mounted to the underside of an aircraft wing.

FIG. 4 shows the adapter and engine of FIG. 1 being mounted to the side of an aircraft fuselage.

DESCRIPTION OF THE PREFERRED EMBODIMENT

Referring to the drawings, FIGS. 1 and 2 show an aircraft engine 10 having an engine casing 12 circumscribing an engine core 13. The engine casing 12 is comprised of a plurality of casing sections 14, only a portion of which are shown. The edges of the casing sections have outwardly extending flanges 15 which also extend circumferentially about the engine casing 12. The casing sections 14 are coupled to adjoining sections 14 by bolting abutting flanges 15 together. The engine core 13 is comprised of a rotor 22 and a flow path 24. The rotor 22 has an inlet cone 26 and an array of rotor blades 28 radially extending from the cone 26 into the flow path 24.

Mounted atop the engine casing 12 is an engine mount adapter 30. The adapter 30 is an arcuate shaped member having sufficient lateral curvature so as to be positionable at any location along the length and about the circumference of the engine casing 12. Preferably, the adapter 30 sweeps out an angle in the range of about 120 degrees to about 180 degrees. The adapter 30 has a first flange 32 extending radially outwards from a front edge 34 and has a second flange 36 extending radially outwards from a back edge 38. The flanges 32 and 36 have plurality of bolt holes which are each coupled to one of the flanges 15 on the engine casing 12. The use of a plurality of bolts is preferred over a single point coupling means because the plurality of bolts allow for a more even transmission of loads from the adapter 30 to the engine casing 12. Between the edges 34 and 38 are two parallel rails 40 and 42. Each of the rails 40 and 42 extend outwards from and circumferentially about the adapter 30, and define a channel 44. The rails 40 and 42 are of sufficient thickness to provide rigidity to the adapter 30. Additional rigidity is provided by stiffening members 48 disposed axially between the rails 40, 42 and the edges 34 and 36 respectively. Within the channel 44 is a first block 50 having a hole 52 shaped for receiving a thrust pin 56. The thrust pin 56 is locked into the hole 52 by a pin member 54. Also within the channel 44 is a second block 60 having a hole 62 for receiving a stabilizing pin 66. The stabilizing pin 66 is locked into the hole 62 by a pin member 64. Preferably, the adapter 30 is a single cast piece. Alternatively, the the adapter 30 could be an assembly of separately fabricated sections.

In the preferred embodiment, an axial support member 70 is included as part of the adapter 30. The axial support member 70 as an outward extending flange 72 and an inward extending flange 74. The flange 74 is coupled to one of the flanges 15 of the casing sections 14. The flange 72 is coupled to the flange 36 and to outer portion of a shear plate 76. The lower portion of the shear plate 76 is coupled to one of the flanges 15 of the casing sections 14. The axial support member 70 provides a path for transmitting loads in the event that the section of the adapter between the front edge 34 and the rail 40 structurally fails. The axial support member 70 is only required if structural failure between the front edge 34 and the rail 40 is a concern.

A method for coupling an aircraft engine 10 having incompatible pickup points with an aircraft 5 is also provided. In this method, the engine mount adapter 30 is axially and circumferentially oriented about the casing 12 of the engine 10 until the pickup points on the aircraft 5 align with the holes 52 and 62. Then the adapter 30 is coupled to the casing 12 and the stabilizing and thrust pins are locked in to the holes 52 and 62. Finally, the pins are attached to the pickup points in the aircraft 5.

The advantages of the engine mount adapter and method becomes apparent after viewing FIGS. 3 and 4. If one desires to couple any engine to an aircraft having its engine pickup points under one of the wings, one simply rotates the adapter to the proper position and couples the adapter to the engine casing and then the engine to the aircraft. Likewise, the same engine can be mounted to an aircraft having its pickup points on its fuselage by simply removing the adapter and engine from the wing, positioning the adapter along the length and about the circumference of the engine casing until the proper position is reached, attaching the adapter to the engine casing, and then the engine to the fuselage. Further, because the engine mount adapter can be positioned anywhere along the length of the engine it can be used to replace either a forward or rear mount.

Various modifications and alterations to the above described system will be apparent to those skilled in the art. Accordingly, the foregoing detailed description of the preferred embodiment of the invention should be considered exemplary in nature and not as limiting to the scope and spirit of the invention as set forth in the following claims.

What is claimed is:

1. An engine mount adapter for coupling an aircraft engine, having an engine casing, to an aircraft wherein the pick up points on the engine are incompatible with the location of the aircraft's stabilizing pin and thrust pin, comprising;
   an arcuate shaped member mounted over said engine casing and having sufficient lateral curvature so that said member is selectively positionable along the length and about the circumference of said engine casing, said member having a front edge and a back edge;
   at least two substantially parallel rails, substantially intermediate said front and back edges and circumferentially disposed about said member, said rails defining a channel therebetween; and
   a first block disposed in said channel and integral with said rails having means for locking onto said thrust pin; and
   a second block disposed in said channel and integral with said rails having means for locking onto said stabilizing pin.

2. The engine mount adapter of claim 1 further comprising an axial support member extending rearwards from said back edge and having a lateral curvature similar to that of said arcuate shaped member.

3. An engine mount adapter for coupling an aircraft engine, having an engine casing comprised of a plurality of sections having edges with outward extending flanges, to an aircraft wherein the pick up points on the engine are incompatible with the location of the aircraft's stabilizing pin and thrust pin, comprising;
   an arcuate shaped member positioned over said engine casing and having sufficient lateral curvature so that said member is selectively positionable along the length and about the circumference of said engine casing, said member having a first front edge with and a back edge;
   a first flange extending outwards from said front edge and coupled to one of said flanges extending outwards from said engine casing;
   a second flange extending outwards from said back edge and coupled to one of said flanges extending outwards from said engine casing;
   at least two substantially parallel rails, substantially intermediate said front and back edges and circumferntially disposed along said member, said rails defining a channel therebetween; and
   a first block disposed in said channel and integral with said rails having means for locking onto said thrust pin; and
   a second block disposed in said channel and integral with said rails having a means for locking onto said stabilizing pin.

4. The engine mount adapter of claim 3 further comprising:
   an axial support member extending rearwards form said back edge having a lateral curvature similar to that of said arcuate shaped member;
   a third flange extending outwards from a front edge of said axial support member;
   a fourth flange extending inwards from a rear edge of said axial support member and coupled to one of said flanges extending outwards from said engine casing; and
   an annular shear plate having an inner portion coupled to one of said flanges extending outwards from said engine casing and having an outer portion coupled to both said second flange and said third flange.

5. The engine mount adapter of claim 4 further comprising a plurality of stiffening members disposed between said first flange and one of said rails and between said second flange and the other of said rails.

* * * * *